US006613451B1

(12) United States Patent
Asahara et al.

(10) Patent No.: US 6,613,451 B1
(45) Date of Patent: *Sep. 2, 2003

(54) METALLIC MATERIAL

(75) Inventors: Hajime Asahara, Kanagawa (JP); Kazuhiko Fukamachi, Kanagawa (JP)

(73) Assignee: Nippon Mining & Metals Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/786,010

(22) PCT Filed: Sep. 10, 1999

(86) PCT No.: PCT/JP99/04951

§ 371 (c)(1), (2), (4) Date: Apr. 12, 2001

(87) PCT Pub. No.: WO00/15876

PCT Pub. Date: Mar. 23, 2000

(30) Foreign Application Priority Data

Sep. 11, 1998 (JP) .......................................... 10-258036
Sep. 28, 1998 (JP) .......................................... 10-273136
Sep. 28, 1998 (JP) .......................................... 10-273276
Sep. 28, 1998 (JP) .......................................... 10-273451

(51) Int. Cl.[7] .......................... B32B 15/20; C25D 5/50; H01R 13/03

(52) U.S. Cl. ....................... 428/647; 428/648; 428/929; 428/675; 205/226; 439/886

(58) Field of Search ................................ 428/647, 648, 428/929, 675; 439/886, 887; 205/226; 148/518, 537

(56) References Cited

U.S. PATENT DOCUMENTS 4,503,131 A * 3/1985 Baudrand .................. 200/266
5,486,721 A * 1/1996 Herklotz et al. ............ 257/666
5,516,594 A * 5/1996 Hasegawa .................... 428/626
6,117,566 A * 9/2000 Matsumoto et al. ........ 205/271
6,287,896 B1 * 9/2001 Yeh et al. .................... 438/106
6,403,234 B1 * 6/2002 Kodama et al. ............ 428/610

FOREIGN PATENT DOCUMENTS

JP 59-149042 * 8/1984
JP 61-049450 * 3/1986
JP 61-091394 5/1986
JP 63-121693 5/1988
JP 02-138484 5/1990
JP 04-255259 * 9/1992
JP 10-060666 3/1998

* cited by examiner

*Primary Examiner*—John J. Zimmerman
(74) *Attorney, Agent, or Firm*—Scully, Scott Murphy & Presser

(57) ABSTRACT

Ni alloy or Cu alloy containing P and/or B is plated on a base metal consisting of Cu or Cu alloy as an intermediate layer, Sn or Sn alloy is further plated on the content of P or B in the plating layer is limited by carrying out reflow treatment, whereby, heat resistance and insertion and withdrawal properties are improved.

22 Claims, 1 Drawing Sheet

METALLIC MATERIAL

TECHNICAL FIELD

The present invention relates to a metallic material provided with a intermediate layer in which Ni alloy or Cu alloy is plated on a base metal consisting of Cu or Cu alloy, and a surface layer in which Sn or Sn alloy is plated on this intermediate layer. More particularly, the present invention relates to a metallic material, for electronic components, having superior heat resistance, soldering properties, resistance to degradation of the appearance thereof, and insertion and withdrawal properties when the material is employed as a contact member.

BACKGROUND ART

In metallic materials for electronic components, many metallic materials of plated Sn or Sn alloy, such as for contacts, are employed primarily for connector contacts for civilian use and wire harnesses for automobile electrical systems. However, in Sn or Sn alloy plated material, interdiffusion progresses between base metals such as Cu, Ni, etc., and the plating layer at the surface, whereby many properties such as contact resistance, resistance against thermal peeling, and soldering properties, degrade over time. That is to say, the properties degrade by aging. In particular, the degradation is remarkable in the vicinity of the automobile engine, or the like, since the higher the temperature, the more this phenomenon is promoted.

In such a situation, the demand for heat resistance in the connector material has become more severe by USCAR, which sets the standards for car components, established by the three largest automobile manufacturers in the United States. In the severest use condition, heat resistance to normal use at 155° C. and a maximum allowable 175° C. are required. In particular, in automobile connector materials, demands for heat resistance has become more severe in Japan, and heat resistance to about 150° C. is required.

Moreover, in the case in which the production base for the connector manufacturer is moved to other countries, the material is sometimes stored for long periods, until it is used, after plating. Therefore, plated material in which each property thereof does not degrade even if the material is stored over long periods, that is, plated material in which aging degradation resistance is high, is required. Nevertheless, degradation in properties of the plated material is accelerated at high temperatures. Therefore, material in which the degradation in properties at high temperatures is small will not experience degradation of each of the properties even if it is stored over long periods. Therefore, a plated material having high heat resistance is required even in this field.

The above property degradation is eased to a certain extent in the case in which Cu or Ni is plated as an intermediate layer. However, resistance against thermal peeling remarkably degrades when the intermediate layer consists of Cu. When the intermediate layer consists of Ni, so that Ni may suppress diffusion of Cu, properties are also improved over the case in which Cu was used; however, it is not satisfactory from the point of view of soldering properties. Furthermore, although sealing may be tried as an after-treatment following plating, each of the properties is not sufficiently improved.

As a means for suppressing the diffusion of Cu, a means for intervening Cu—Ni alloy between the base material and the plating layer at the surface has been proposed (PCT/US96/19768). However, although increase of contact resistance is suppressed in this technique, aging degradation resistance of soldering properties is not improved.

In addition, as a problem characteristic of Sn plated material, the Sn plated material is soft, so that a gas-tight structure is produced when a male pin is adhered to a female pin employed at a point of contact in a connector. Therefore, the Sn plated material has a disadvantage in that the insertion force of the connector is higher than that for a connector consisting of Au plating, etc.

In such a situation, the demand for forming multiple cores in a connector has recently become much more severe with the increasing miniaturization, weight reduction, and multifunctionalization, not only in automobile components, but also in general connectors. However, if the present Sn plated material is used to form multiple cores, the insertion force for the connector increases. In the assembly process for automobiles in which Sn plated connectors are mainly used, the connectors are manually connected, so that increase in the insertion force directly lowers the workability thereof.

As a means of dealing with this problem, the following technique (Japanese Unexamined Patent Application Publication No. 320668/97) has been proposed. In this technique, Cu or Ni is plated as an intermediate layer, whereby wear resistance of Sn plating or Sn alloy plating at the surface is reduced, so that insertion and withdrawal properties are improved. According to this technique, problems with respect to insertion of the connector can be avoided; however, the above-mentioned heat resistance, particularly the aging degradation resistance of soldering properties, cannot be prevented.

DISCLOSURE OF INVENTION

It is therefore an object of the present invention to provide a metallic material in which aging degradation can be prevented in high temperature environments in the vicinity of automobile engines, etc., insertion and withdrawal resistance can be improved, and further more, properties such as soldering properties, etc., are not degraded even if the material is stored over long periods.

A metallic material according to the present invention is characterized in that an intermediate layer made of an alloy plating consisting of Ni alloy or Cu alloy contains at least one of P in an amount of 0.05 to 20% by weight and B in an amount of 0.05 to 20% by weight, and is provided on a base metal consisting of Cu or Cu alloy and a surface layer consisting of Sn or Sn alloy plating is further provided on the intermediate layer. Effects and preferable embodiments of the present invention will be explained. In the following explanation, “percent” refers to “percent by weight”.

According to a preferred embodiment of the present invention, an intermediate layer is made of an alloy consisting of P in an amount of 0.05 to 20%, and the balance consisting of Ni and unavoidable impurities, or an alloy consisting of B in an amount of 0.05 to 20%, and the balance consisting of Ni and unavoidable impurities. Furthermore, according to another preferred embodiment of the present invention, an intermediate layer is made of an alloy containing P in an amount of 0.05 to 20%, B in an amount of 0.05 to 20%, and the balance consisting of Ni and unavoidable impurities.

Of the primary metals constituting the intermediate layer, Ni is an element which can maintain P, B, Cu, Sn, and Zn in the intermediate layer, and can be alloy-plated with any of the above elements. As another function of Ni, suppressive effects diffusion of Cu, which is a degrading factor in heat resistance, may be mentioned. However, in the case in which the intermediate layer consists of only Ni, degradation of soldering properties after exposure to high temperature cannot be prevented. It seems that this is due to the inside of the plating layer being oxidized by the heating. That is to say, since wettability of Ni oxide for solder is generally unsatisfactory, it is assumed that soldering properties are lowered by the existence of the Ni oxide when the inside thereof is oxidized.

In contrast, in the case in which an intermediate layer consists of Ni alloy containing P and/or B, it is assumed that P and B are diffused toward the surface by heating, whereby oxidation in the inside and the surface of the surface layer is prevented, so that degradation of soldering properties is suppressed.

Furthermore, it is assumed that P oxide and B oxide films are formed on the surface by diffusion of P or B and that the insertion and withdrawal resistance, in the case in which this film is used for a connector, is lowered. Moreover, an alloy to which P or B is added to Ni is much harder than base metal and plating of the surface layer. For example, when an alloy in which Ni contains P in an amount of 1 to 15% is plated, Vickers hardness (Hv) reaches about 700. In contrast, hardness of Sn or Sn alloy plating of the surface layer is about 10 Hv. Therefore, it is assumed that thin film metal of the surface layer works as a solid lubricant since hardnesses of the surface layer and the intermediate layer are remarkably different, whereby insertion and withdrawal resistance is lowered.

P and B content in the intermediate layer may be decided according to the heat resistance required; however, effects thereof are insufficient when the content is under 0.05%. Therefore, it is desirable that the content be preferably 0.5% or more. The upper limit at which these metals can alloy with Ni is 20%, and it is difficult to contain more P and B than this. It is more desirable for it to be 15% or less, since tensile stress in the plating film increases and cracks in the plating are caused when P and B exceed 15%.

According to another preferred embodiment of the present invention, an intermediate layer is made of an alloy consisting of P in an amount of 0.05 to 20%, at least one of Sn, Cu, and Zn, in a total amount of 10 to 60%, and the balance consisting of Ni and unavoidable impurities, or an alloy consisting of B in an amount of 0.05 to 20%, at least one of Sn, Cu, and Zn, in a total amount of 10 to 60%, and the balance consisting of Ni and unavoidable impurities.

In the case in which low workability of Ni—P alloy or Ni—B alloy is supplemented, Cu and Zn are added as additional elements besides P and B. When the insertion and withdrawal properties are further improved by improving the hardness of the intermediate layer, Sn is added therein, depending on need. Effects of each element are not sufficiently demonstrated if the total content of at least one of Sn, Cu, and Zn is under 10%. In contrast, the original controlling effect of Ni on diffusion of Cu is insufficient if the total content thereof exceeds 60%.

Since Co is contained in a bath and an anode of Ni plating as an unavoidable impurity, it is possible that Co in an amount of about 1 to 2% is mixed in a plating film, depending on Ni salt used for the bath and grade of the anode. However, Co in this amount dose not exert large effects on properties of Ni—P alloy plating and Ni—P—B alloy plating. Therefore, Co as an impurity can be disregarded.

It is assumed that P and/or B are diffused at the surface or the inside of a surface layer plated Sn or Sn alloy by carrying out reflow treatment or aging treatment afterwards, whereby these elements prevent the inside and the surface thereof from oxidizing, so that degradation of soldering properties is suppressed, in the case in which an intermediate layer is made of Ni alloy containing P and/or B.

Therefore, a metallic material according to another preferred embodiment of the present invention is characterized in that an intermediate layer consisting of electroplated Ni alloy containing P and/or B in a total amount of 0.05 to 20% is provided, and a surface layer consisting of Sn or Sn alloy plating is further provided on the intermediate layer, and P and/or B contained in the intermediate layer is diffused to the surface in the surface layer by carrying out reflow treatment and/or heating treatment. In this case, it is desirable that the content of P and/or B in the surface layer range from 0.01 to 1% in order to suitably obtain an antioxidation effect. Furthermore, the intermediate layer can consist of Ni alloy containing, similarly to the above, P and/or B in a total amount of 0.05 to 20%, and at least one of Sn, Cu, and Zn, in a total amount of 10 to 60%.

It is necessary that the thickness of the intermediate layer be 0.5 $\mu$m or more, and more preferably be 1.0 $\mu$m or more, since the above heat resistant effect is not obtained when it is under 0.5 $\mu$m. The upper limit is preferably 3 $\mu$m or less, since pressing property is lowered when the intermediate layer is too thin.

The thickness of a diffusion layer formed between the surface layer and the intermediate layer and consisting mainly of Sn and Cu is preferably 1 $\mu$m or less. When it exceeds 1 $\mu$m, pure Sn or Sn alloy plating layer at the surface layer is relatively thin and heat resistance is degraded. Grain size constituting the diffusion layer can be observed by dissolving only the pure plating portion (deposited Sn or Sn alloy layer) above the diffusion layer using an electrolytic method and then removing this. In the case in which average grain size of the diffusion layer exceeds 1 $\mu$m, when solder wets the surface of the diffusion layer, the wettable surface area decreases and the soldering property is lowered. Therefore, it is necessary to have a grain size of 1 $\mu$m or less in order to improve wettability of the solder, and it is desirable that it be, more preferably, 0.8 $\mu$m or less.

It is necessary to have the thickness of the plating layer at the surface consisting of Sn or Sn alloy be 0.3 $\mu$m or more since contact resistance cannot be prevented from degrading when it is under 0.3 $\mu$m. It is necessary that the upper limit of thickness be 3 $\mu$m or less, since insertion and withdrawal properties are lowered with an increase in thickness. Since a part of the plating layer at the surface consisting of Sn or Sn alloy is formed with a diffusion layer on the intermediate layer and the thickness of the pure plating layer decreases when reflow treatment is carried out, it is necessary that the thickness of the Sn plating layer before carrying out the reflow treatment be 0.5 $\mu$m or more, and considering productivity, it is desirable that the thickness be 1 to 2 $\mu$m.

Furthermore, the thickness ratio of the plating layer at the surface consisting of the Sn or Sn alloy and the intermediate layer ranges from 1:2 to 1:3 in order to yield the lubrication effect of the metallic thin film, as mentioned above.

Moreover, as an effect of the reflow treatment, the following functions may be mentioned. The above diffusion layer is formed; diffusion of P and B contained in the intermediate layer toward the surface is enhanced, whereby oxidation in the inside of the plating layer is prevented; and a protective film of these oxides is formed on the surface layer. As a means other than the reflow treatment, aging treatment may be mentioned. For example, P can be also diffused by carrying out aging treatment at 100° C. for 12 hours. When the diffusion of P or B by the above reflow treatment is insufficient, the aging treatment is further carried out, depending on need, whereby properties such as soldering properties and insertion and withdrawal properties can also be improved. Alternatively, without carrying out the reflow treatment, P or B can also be diffused only by the aging treatment.

In the plating layer at the surface, besides Sn or Sn alloy, mainly a solder plating such as Sn—Pb, and a solder which does not contain Pb, such as Sn—Ag and Sn—Bi, can be employed.

As a plating solution for the intermediate layer, $NiSO_4$—$NiCl_2$—$H_3PO_4$—$H_2PHO_3$ type, etc., can be employed in basic Ni—P alloy plating. The $H_3PO_4$ is a pH buffer and the $H_2PHO_3$ controls the P content in the plating film by changing the addition amount. However, the composition and condition of the plating bath in each plating in this application can be optionally chosen. Aa an alloying element besides P, B, Cu, Sn, and Zn can be alloyed by respectively adding metal salts such as borane amine complex (as a source which supplies B in the plating film), $CuSO_4$, $SnSO_4$, and $ZnSO_4$ in a required amount. Since Cu has a higher natural potential than others, a complexing agent is used in the addition of Cu. Glycine added as a complexing agent forms eutectoids of Ni and Cu. The complexing agent must be suitably chosen depending on the pH of the plating bath. However, effects of the present invention are not limited at all by the selection of these conditions.

As a method for Sn or Sn alloy plating at the surface, electroplating or hot dipping may be used. In electroplating, well-known plating solutions such as the sulfuric acid type, methanesulfonic acid type, phenolsulfonic acid type, etc., can be used. By carrying out reflow treatment after the electroplating and aging treatment thereafter, depending on need, or by carrying out aging treatment immediately after the electroplating, P and B contained in the intermediate layer are diffused toward the surface layer with increase in thickness of the diffusion layer consisting of Ni—Sn, whereby heat resistance and insertion and withdrawal properties are improved. As a means for omitting the aging treatment after the plating, means for containing P and/or B in advance in the Sn or Sn alloy plating layer at the surface is effectively employed. In this case, the plating is limited to hot dipping, and P and/or B can be alloyed by being dissolved in advance in melted Sn or Sn alloy.

In the above, the intermediate layer consists of alloy containing Ni; however, metallic material according to the present invention is satisfactory if only an alloy layer containing Ni exists under the Sn or Sn alloy plating layer at the surface. The present invention is effective even if another plating layer exists between the Ni alloy layer and the base metal consisting of Cu alloy. Furthermore, in the present invention, an alloy layer containing Cu can be intervened below the Sn or Sn alloy plating layer at the surface.

That is to say, according to another embodiment of the present invention, an intermediate layer is made of an alloy consisting of P in an amount of 0.05 to 15%, and the balance consisting of Cu and unavoidable impurities, or an alloy consisting of P in an amount of 0.05 to 15%, at least one of Sn, Ni, and Zn, in a total amount of 10 to 60%, and the balance consisting of Cu and unavoidable impurities. Alternatively, an intermediate layer is made of an alloy consisting of P in an amount of 0.05 to 15%, B in an amount of 0.05 to 15%, and the balance consisting of Cu and unavoidable impurities, or an alloy consisting of P in an amount of 0.05 to 15%, B in an amount of 0.05 to 15%, at least one of Sn, Ni, and Zn, in a total amount of 10 to 60%, and the balance consisting of Cu and unavoidable impurities. In the following, effects and preferable embodiments in the case in which an intermediate layer is made of an alloy consisting primarily of Cu will be explained.

Cu deposited by electroplating is characterized in that diffusion thereof toward the Sn plating layer at the surface is slower than that of the Cu contained in the base metal. Therefore, soldering properties that Cu alloy is employed as the intermediate layer thereof are slightly inferior to that of a metallic material having an intermediate layer consisting primarily of Ni; however, degradation of properties is less than that in a metallic material not having an intermediate layer. The intermediate layer or the surface layer contains an active metal such as P and B, whereby the active metal is diffused toward the surface and oxidation of the inside and the surface thereof is suppressed, so that each property, particularly the soldering properties, is improved in comparison with the case in which the intermediate layer is simply made of Cu.

It is assumed that the oxide film of P and B is formed by the diffusion thereof toward the surface, as well as a metallic material having an intermediate layer consisting primarily of Ni, whereby this film has lower insertion and withdrawal resistance when this metallic material is employed as a connector. Hardness thereof is increased over that of the Cu simple layer since the intermediate layer is alloyed, whereby thin film metal lubricating effects are also obtained.

The content of P and B in the intermediate layer can be optionally set in proportion to required properties; however, it is desirable that it be 0.5% or more, since the above effects are not sufficiently obtained if the content is under 0.05% when the intermediate layer is made of alloy consisting primarily of Cu. In the case in which an intermediate layer is made of alloy consisting primarily of Cu, limiting the content of P and B to 15%, the plating film is weakened, especially when the P content exceeds 10%. Therefore, it is desirable that the P content be 10% or less.

As another additional element besides P and B, at least one of Sn, Ni, and Zn can be added in a total amount of 10 to 60%. When the total amount of of Sn, Ni, and Zn is under 10%, the effects of each element are not demonstrated, whereas when the total amount exceeds 60%, the value as scrap is lowered.

It is desirable that thickness of the intermediate layer be 0.5 to 3.0 μm and more preferably be 1.0 to 3.0 μm, as in the case in which an intermediate layer is made of alloy consisting primarily of Ni. It is desirable that the thickness of a diffusion layer consisting mainly of Sn and Cu be formed between a surface layer and an intermediate layer and be 1 μm or less, and it is desirable that the average grain size constituting the diffusion layer be 1.5 μm or less and more preferably be 1.0 μm or less. The reasons for these numerical value ranges are the same as the above. For the same reasons, it is desirable that the thickness of the Sn or Sn alloy plating layer at the surface be 0.3 to 3.0 μm. It is desirable that the thickness of the Sn plating layer before carrying out reflow treatment be 0.5 μm or more and more preferably be 1 to 2 μm. It is desirable that the ratio of thickness of the Sn or Sn alloy plating layer at the surface and that of the intermediate layer range from 1:2 to 1:3.

Moreover, in the case in which P and/or B is not diffused sufficiently only by reflow treatment or hot dipping, for example, aging treatment is carried out at 100° C. for 12 hours, depending on need, whereby soldering properties and insertion and withdrawal properties can be improved. It is also effective for the aging treatment to be carried out directly after the plating, without carrying out the reflow treatment.

In the plating layer at the surface, besides Sn or Sn alloy, mainly a solder plating such as Sn—Pb, and a solder which does not contain Pb, such as Sn—Ag and Sn—Bi, can be employed.

As a plating bath for the intermediate layer, a bath to which $NaPH_2O_2$ is added to a pyrophosphate type Cu plating bath can be employed in basic Cu—P alloy plating. Complexing agents are also added in appropriate ratios, depending on the Cu composition required. However, composition and condition of the plating bath in each plating in this application can be optionally chosen. As an alloying element besides P, B obtained from borane amine complex, and other elements chosen from suitable metal salts, depending on the plating bath, can be employed. However, effects of the present invention are not limited at all by the selection of these conditions.

As a method for Sn or Sn alloy plating at the surface, electroplating or hot dipping may be used at well-known plating conditions. In the electroplating, by carrying out reflow treatment after the electroplating, a diffusion layer is formed, and P and B contained in the intermediate layer are diffused, whereby heat resistance and insertion and withdrawal properties are improved.

As a means for omitting the aging treatment after the plating, a means for containing P and/or B in advance in the Sn or Sn alloy plating layer at the surface is effectively employed. In this case, the plating is limited to the hot dipping, and P or B can be alloyed by being dissolved in advance in melted Sn or Sn alloy.

BEST MODE FOR CARRYING OUT THE INVENTION

First Embodiment

Figure 1:
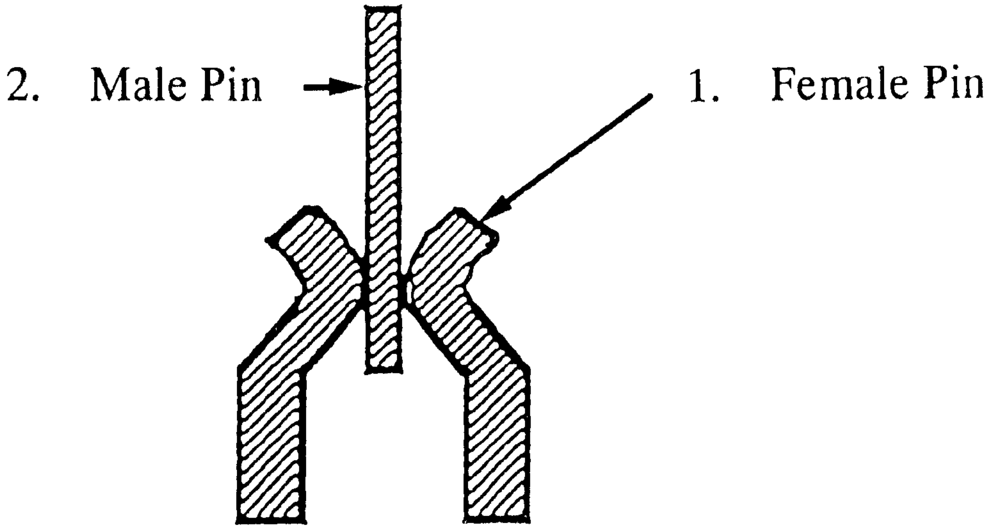
FIG. 1 is a drawing explaining evaluation tests for the insertion and withdrawal properties according to the present invention.

Effects of the present invention are specifically explained based on this embodiment. As a base metal, phosphor bronze (according to Japanese Industrial Standard C5191) having a thickness of 0.2 mm for the evaluation of heat resistance, and an oxygen free copper (according to Japanese Industrial Standard C1020) having a thickness of 0.5 mm for the evaluation of insertion and withdrawal properties, which were degreased and pickled, were employed. Surface layers of these materials were plated by Sn and reflowed, and these materials were employed for evaluation.

Plating conditions of a Ni—P type and types to which Sn, Cu, or Zn were added thereto are shown in Tables 1 to 4, and plating conditions of a Ni—P—B type and types to which Sn, Cu, or Zn were added thereto are shown in Tables 5 to 8.

TABLE 1

Ni—P Alloy Plating Conditions

| | | Conditions |
|---|---|---|
| Plating Solution Composition | $NiSO_4$ | 150 g/L |
| | $NiCl_2$ | 45 g/L |
| | $H_3PO_4$ | 50 g/L |
| | $H_2PHO_3$ | 0.25~10 g/L |
| Plating Solution Temperature | | 70° C. |
| Current Density | | 10 A/dm$^2$ |
| Plating Thickness | | 2.0 μm |

TABLE 2

Ni—P—Sn Alloy Plating Conditions

| | | Conditions |
|---|---|---|
| Plating Solution Composition | $NiSO_4$ | 150 g/L |
| | $SnSO_4$ | 20 g/L |
| | $H_3PO_4$ | 50 g/L |
| | $H_2PHO_3$ | 0.25~10 g/L |
| Plating Solution Temperature | | 70° C. |
| Current Density | | 10 A/dm$^2$ |
| Plating Thickness | | 2.0 μm |

TABLE 3

Ni—P—Cu Alloy Plating Conditions

| | | Conditions |
|---|---|---|
| Plating Solution Composition | $NiSO_4$ | 100 g/L |
| | $CuSO_4$ | 10 g/L |
| | Glycine | 30 g/L |
| | $H_3PO_4$ | 25 g/L |
| | $H_2PHO_3$ | 0.25~10 g/L |
| Plating Solution Temperature | | 25° C. |
| Current Density | | 2 A/dm$^2$ |
| Plating Thickness | | 2.0 μm |

TABLE 4

Ni—P—Zn Alloy Plating Conditions

| | | Conditions |
|---|---|---|
| Plating Solution Composition | $NiSO_4$ | 150 g/L |
| | $ZnSO_4$ | 20 g/L |
| | $Na_2SO_4$ | 150 g/L |
| | $H_3PO_4$ | 40 g/L |
| | $H_2PHO_3$ | 0.25~10 g/L |
| Plating Solution Temperature | | 70° C. |
| Current Density | | 10 A/dm$^2$ |
| Plating Thickness | | 2.0 μm |

TABLE 5

Ni—P—B Alloy Plating Conditions

| | | Conditions |
|---|---|---|
| Plating Solution Composition | $NiSO_4$ | 150 g/L |
| | $NiCl_2$ | 45 g/L |
| | $H_3PO_4$ | 50 g/L |
| | $H_2PHO_3$ | 0.25~10 g/L |
| | Borane Dimethylamine Complex | 0.5~1.0 g/L |

TABLE 5-continued

| Ni—P—B Alloy Plating Conditions | Conditions |
|---|---|
| Plating Solution Temperature | 50° C. |
| Current Density | 5 A/$dm^2$ |
| Plating Thickness | 2.0 μm |

TABLE 6

| Ni—P—B—Sn Alloy Plating Conditions | | Conditions |
|---|---|---|
| Plating Solution Composition | $NiSO_4$ | 150 g/L |
| | $SnSO_4$ | 20 g/L |
| | $H_3PO_4$ | 50 g/L |
| | $H_2PHO_3$ | 0.5~10 g/L |
| | Borane Dimethylamine Complex | 0.5~1.0 g/L |
| Plating Solution Temperature | | 50° C. |
| Current Density | | 3 A/$dm^2$ |
| Plating Thickness | | 2.0 μm |

TABLE 7

| Ni—P—B—Cu Alloy Plating Conditions | | Conditions |
|---|---|---|
| Plating Solution Composition | $NiSO_4$ | 100 g/L |
| | $CuSO_4$ | 10 g/L |
| | Glycine | 30 g/L |
| | $H_3PO_4$ | 25 g/L |
| | $H_2PHO_3$ | 0.25~10 g/L |
| | Borane Dimethylamine Complex | 0.5~1.0 g/L |
| Plating Solution Temperature | | 25° C. |
| Current Density | | 2 A/$dm^2$ |
| Plating Thickness | | 2.0 μm |

TABLE 8

| Ni—P—B—Zn Alloy Plating Conditions | | Conditions |
|---|---|---|
| Plating Solution Composition | $NiSO_4$ | 150 g/L |
| | $ZnSO_4$ | 20 g/L |
| | $Na_2SO_4$ | 150 g/L |
| | $H_3PO_4$ | 40 g/L |
| | $H_2PHO_3$ | 0.25~10 g/L |
| | Borane Dimethylamine Complex | 0.5~1.0 g/L |
| Plating Solution Temperature | | 50° C. |
| Current Density | | 3 A/$dm^2$ |
| Plating Thickness | | 2.0 μm |

The Sn plating conditions of the surface layer are shown in Table 9.

TABLE 9

| Reflowed Sn Plating Conditions | | Conditions |
|---|---|---|
| Plating Solution Composition | Methane-sulfonic acid | 100 g/L |
| | Tin Methane-sulfonate | 200 g/L |
| | Surfactant | 2 g/L |
| Plating Solution Temperature | | 40° C. |
| Current Density | | 10 A/$dm^2$ |
| Reflow Condition | | 260° C., 5s, Quenching at 60° C. |
| Plating Thickness | | 1.5 μm |

Composition of the intermediate layer, thickness and average grain size of the diffusion layer, and thickness of the surface layer, are shown in Table 10.

TABLE 10

Composition of Intermediate Layer, Thickness of Each Layer, and Average Grain Size of Diffusion Layer

| No. | Intermediate Layer Composition | Thickness of Intermediate Layer μm | Thickness of Diffusion Layer μm | Average Grain Size of Diffusion Layer μm | Thickness of Surface Plating Layer μm |
|---|---|---|---|---|---|
| 1 | Ni—1.0%P | 1.7 | 0.3 | 0.2 | 1.2 |
| 2 | Ni—6.4%P | 1.5 | 0.5 | 0.2 | 1.0 |
| 3 | Ni—11.2%P | 1.4 | 0.6 | 0.2 | 0.9 |
| 4 | Ni—0.8%P—15.2%Cu | 1.6 | 0.4 | 0.4 | 1.1 |
| 5 | Ni—4.4%P—15.2%Cu | 1.6 | 0.4 | 0.4 | 1.1 |
| 6 | Ni—9.2%P—16.1%Cu | 1.4 | 0.6 | 0.4 | 0.9 |
| 7 | Ni—1.2%P—15.5%Sn | 1.5 | 0.5 | 0.4 | 1.0 |
| 8 | Ni—6.6%P—15.5%Sn | 1.5 | 0.5 | 0.4 | 1.0 |
| 9 | Ni—12.2%P—16.0%Sn | 1.3 | 0.7 | 0.5 | 0.8 |
| 10 | Ni—0.9%P—15.2%Zn | 1.6 | 0.4 | 0.3 | 1.1 |
| 11 | Ni—5.5%P—15.2%Zn | 1.6 | 0.4 | 0.3 | 1.1 |
| 12 | Ni—10.3%P—15.5%Zn | 1.4 | 0.6 | 0.4 | 0.9 |
| 13 | Ni—0.8%P—0.25%B | 1.7 | 0.3 | 0.2 | 1.2 |
| 14 | Ni—5.2%P—0.25%B | 1.7 | 0.3 | 0.2 | 1.2 |
| 15 | Ni—10.4%P—1.2%B | 1.5 | 0.5 | 0.3 | 1.0 |
| 16 | Ni—0.7%P—0.4%B—15.2%Cu | 1.6 | 0.4 | 0.4 | 1.1 |

TABLE 10-continued

Composition of Intermediate Layer, Thickness of Each Layer, and Average Grain Size of Diffusion Layer

| No. | Intermediate Layer Composition | Thickness of Intermediate Layer μm | Thickness of Diffusion Layer μm | Average Grain Size of Diffusion Layer μm | Thickness of Surface Plating Layer μm |
|---|---|---|---|---|---|
| 17 | Ni—4.4%P—0.4%B—15.2%Cu | 1.6 | 0.4 | 0.4 | 1.1 |
| 18 | Ni—9.2%P—1.2%B—16.1%Cu | 1.4 | 0.6 | 0.3 | 0.9 |
| 19 | Ni—0.8%P—0.4%B—14.4%Sn | 1.7 | 0.3 | 0.5 | 1.2 |
| 20 | Ni—5.2%P—0.4%B—14.4%Sn | 1.7 | 0.3 | 0.5 | 1.2 |
| 21 | Ni—10.2%P—1.1%B—15.1%Sn | 1.5 | 0.5 | 0.3 | 1.0 |
| 22 | Ni—0.7%P—0.3%B—5.4%Zn | 1.6 | 0.4 | 0.3 | 1.1 |
| 23 | Ni—4.4%P—0.3%B—5.4%Zn | 1.6 | 0.4 | 0.3 | 1.1 |
| 24 | Ni—9.2%P—1.4%B—5.6%Zn | 1.4 | 0.6 | 0.4 | 0.9 |

In addition, a material having no intermediate layer, a material in which an intermediate layer consisting of Cu having a thickness of 0.5 μm, a material in which an intermediate layer consisting of Ni having a thickness of 2.0 μm, a material in which an intermediate layer consisting of Ni-0.01% P alloy, and a material in which an intermediate layer consisting of Ni-0.01% B alloy, were also prepared as comparative materials.

As an evaluation of the heat resistance, after evaluating materials were to 155° C. for 16 hours, appearance, soldering properties, existence of thermal peeling, and change in contact resistance thereof were evaluated. The evaluating materials were formed in the shapes of male pin and female pin as shown in FIG. 1. The largest insertion force necessary to insert the male pin in the female pin was evaluated for the insertion and withdrawal properties.

The soldering properties were evaluated by measuring solder wetting time in the case in which flux is 25% rosin-ethanol, using the meniscograph method. Plated materials were subjected to cycles of 90° bending, and the existence of the thermal peeling was evaluated by observing the state of the bent portion thereof by visual observation. The materials in which the male pin is fitted into the female pin as shown in FIG. 1, were heated to 155° C. for 16 hours, and the contact resistance was evaluated by measuring the difference between contact resistance (electric resistance) value of the heated material and that of non-heated material. The results are shown in Table 11. Consequently, it was apparent that materials according to the present invention are superior with respect to all evaluation criteria.

TABLE 11

Evaluation of Heat Resistance

| No. | Intermediate Layer Composition | Appearance (1) | Thermal Peering (2) | Soldering Properties (3) After Heating | Soldering Properties (3) Before Heating | Contact Resistance (4) After Heating | Contact Resistance (4) Before Heating |
|---|---|---|---|---|---|---|---|
| Example | | | | | | | |
| 1 | Ni—1.0%P | ◎ | ○ | ◎ | ◎ | ○ | ○ |
| 2 | Ni—6.4%P | ◎ | ○ | ◎ | ◎ | ○ | ○ |
| 3 | Ni—11.2%P | ◎ | ○ | ◎ | ◎ | ○ | ○ |
| 4 | Ni—0.8%P—15.2%Cu | ◎ | ○ | ◎ | ◎ | ○ | ○ |
| 5 | Ni—4.4%P—15.2%Cu | ◎ | ○ | ◎ | ◎ | ○ | ○ |
| 6 | Ni—9.2%P—16.1%Cu | ◎ | Δ | ◎ | ◎ | ○ | ○ |
| 7 | Ni—1.2%P—15.5%Sn | ◎ | Δ | ◎ | ◎ | ○ | ○ |
| 8 | Ni—6.6%P—15.5%Sn | ◎ | ○ | ◎ | ◎ | ○ | ○ |
| 9 | Ni—12.2%P—16.0%Sn | ◎ | ○ | ◎ | ◎ | ○ | ○ |
| 10 | Ni—0.9%P—15.2%Zn | ◎ | ○ | ◎ | ◎ | ○ | ○ |
| 11 | Ni—5.5%P—15.2%Zn | ◎ | ○ | ◎ | ◎ | ○ | ○ |
| 12 | Ni—10.3%P—15.5%Zn | ◎ | ○ | ◎ | ◎ | ○ | ○ |
| 13 | Ni—0.8%P—0.25%B | ◎ | ○ | ◎ | ◎ | ○ | ○ |
| 14 | Ni—5.2%P—0.25%B | ◎ | ○ | ◎ | ◎ | ○ | ○ |
| 15 | Ni—10.4%P—1.2%B | ◎ | ○ | ◎ | ◎ | ○ | ○ |
| 16 | Ni—0.7%P—0.4%B—15.2%Cu | ◎ | ○ | ◎ | ◎ | ○ | ○ |
| 17 | Ni—4.4%P—0.4%B—15.2%Cu | ◎ | ○ | ◎ | ◎ | ○ | ○ |
| 18 | Ni—9.2%P—1.2%B—16.1%Cu | ◎ | Δ | ◎ | ◎ | ○ | ○ |
| 19 | Ni—0.8%P—0.4%B—14.4%Sn | ◎ | Δ | ◎ | ◎ | ○ | ○ |
| 20 | Ni—5.2%P—0.4%B—14.4%Sn | ◎ | ○ | ◎ | ◎ | ○ | ○ |
| 21 | Ni—10.2%P—1.1%B—15.1%Sn | ◎ | ○ | ◎ | ◎ | ○ | ○ |
| 22 | Ni—0.7%P—0.3%B—5.4%Zn | ◎ | ○ | ◎ | ◎ | ○ | ○ |
| 23 | Ni—4.4%P—0.3%B—5.4%Zn | ◎ | ○ | ◎ | ◎ | ○ | ○ |
| 24 | Ni—9.2%P—1.4%B—5.6%Zn | ◎ | ○ | ◎ | ◎ | ○ | ○ |

TABLE 11-continued

Evaluation of Heat Resistance

| No. | Intermediate Layer Composition | Appearance (1) | Thermal Peering (2) | Soldering Properties (3) After Heating | Soldering Properties (3) Before Heating | Contact Resistance (4) After Heating | Contact Resistance (4) Before Heating |
|---|---|---|---|---|---|---|---|
| Comparative Example | | | | | | | |
| 25 | No Intermediate Layer | Δ | ○ | ◎ | Δ | ○ | Δ |
| 26 | Cu | ○ | x | ◎ | ○ | ○ | x |
| 27 | Ni | ◎ | ○ | ◎ | Δ | ○ | Δ |
| 28 | Ni—0.01%P | ◎ | ○ | ◎ | ○ | ○ | Δ |
| 29 | Ni—0.01%B | ◎ | ○ | ◎ | ○ | ○ | Δ |

(1) Appearance ◎: Glossy appearance, ○: Partially haziness, Δ: Semi-gloss
(2) Thermal Peeling ○: No Peeling, Δ: Partially peeling, x: Peeling over entire surface
(3) Soldering Property ◎: Wetting after 1 to 2 seconds, ○: Wetting after 2 to 3 seconds, Δ: Wetting after 3 seconds or more, x: No wetting
(4) Contact Resistance ○: 10 mΩ or less, Δ: 10~20 mΩ, x: 20 mΩ or more The evaluated results with respect to the insertion and withdrawal properties thereof are shown in Table 12. Consequently, it was apparent that the insertion force for the terminal is superior to that of the comparative materials in every type.

TABLE 12

Evaluation of Insertion and Withdrawal Properties

| No. | Intermediate Layer Composition | Insertion and Withdrawal Properties |
|---|---|---|
| Example | | |
| 1 | Ni-1.0% P | ○ |
| 2 | Ni-6.4% P | ○ |
| 3 | Ni-11.2% P | ○ |
| 4 | Ni-0.8% P-15.2% Cu | ○ |
| 5 | Ni-4.4% P-15.2% Cu | ○ |
| 6 | Ni-9.2% P-16.1% Cu | ○ |
| 7 | Ni-1.2% P-15.5% Sn | ○ |
| 8 | Ni-6.6% P-15.5% Sn | ○ |
| 9 | Ni-12.2% P-16.0% Sn | ○ |
| 10 | Ni-0.9% P-15.2% Zn | ○ |
| 11 | Ni-5.5% P-15.2% Zn | ○ |
| 12 | Ni-10.3% P-15.5% Zn | ○ |
| 13 | Ni-0.8% P-0.25% B | ○ |
| 14 | Ni-5.2% P-0.25% B | ○ |
| 15 | Ni-10.4% P-1.2% B | ○ |
| 16 | Ni-0.7% P-0.4% B-15.2% Cu | ○ |
| 17 | Ni-4.4% P-0.4% B-15.2% Cu | ○ |
| 18 | Ni-9.2% P-1.2% B-16.1% Cu | ○ |
| 19 | Ni-0.8% P-0.4% B-14.4% Sn | ○ |
| 20 | Ni-5.2% P-0.4% B-14.4% Sn | ○ |
| 21 | Ni-10.2% P-1.1% B-15.1% Sn | ○ |
| 22 | Ni-0.7% P-0.3% B-5.4% Zn | ○ |
| 23 | Ni-4.4% P-0.3% B-5.4% Zn | ○ |
| 24 | Ni-9.2% P-1.4% B-5.6% Zn | ○ |
| Comparative Example | | |
| 25 | No Intermediate Layer | X |
| 26 | Cu | Δ |
| 27 | Ni | X |
| 28 | Ni-0.01% P | X |
| 29 | Ni-0.01% B | X |

Insertion and Withdrawal Properties
○: 1.2 N or less,
Δ: 1.2~1.4 N,
X: 1.4 N or more

Second Embodiment

Next, a second embodiment according to the present invention is explained. As a base metal, phosphor bronze (according to Japanese Industrial Standard C5191) having a thickness of 0.2 mm for the evaluation of heat resistance, and an oxygen free copper (according to Japanese Industrial Standard C1020) having a thickness of 0.5 mm for the evaluation of insertion and withdrawal properties, which were degreased and pickled, were employed. Surface layers of these materials were plated by Sn and reflowed, and these materials were employed for evaluation.

Plating conditions of a Ni—B type and types to which Sn, Cu, or Zn were added thereto are shown in Tables 13 to 16.

Sn plating conditions of the surface layer are shown in Table 17. Composition of the intermediate layer, thickness and average grain size of the diffusion layer, and thickness of the surface layer, are shown in Table 18. In addition, a material having no intermediate layer, a material in which an intermediate layer consisting of Cu having a thickness of 0.5 $\mu$m, a material in which an intermediate layer consisting of Ni having a thickness of 2.0 $\mu$m, a material in which an intermediate layer consisting of Ni-0.01% P alloy, and a material in which an intermediate layer consisting of Ni-0.01% B alloy, were also prepared as comparative materials.

TABLE 13

Ni—B Alloy Plating Conditions

| | Conditions | |
|---|---|---|
| Plating Solution Composition | $NiSO_4$ | 280 g/L |
| | $NiCl_2$ | 20 g/L |
| | $H_3BO_3$ | 40 g/L |
| | Borane Dimethylamine Complex | 1~4 g/L |
| Plating Solution Temperature | 45° C. | |
| Current Density | 10 A/$dm^2$ | |
| Plating Thickness | 2.0 $\mu$m | |

TABLE 14

Ni—B—Sn Alloy Plating Conditions

| | Conditions | |
|---|---|---|
| Plating Solution Composition | $NiSO_4$ | 280 g/L |
| | $NiCl_2$ | 20 g/L |
| | $H_3BO_3$ | 40 g/L |
| | Borane Dimethylamine Complex | 1~4 g/L |
| | $SnSO_4$ | 20 g/L |
| Plating Solution Temperature | 45° C. | |
| Current Density | 10 A/dm$^2$ | |
| Plating Thickness | 2.0 μm | |

TABLE 15

Ni—B—Cu Alloy Plating Conditions

| | Conditions | |
|---|---|---|
| Plating Solution Composition | $NiSO_4$ | 200 g/L |
| | $CuSO_4$ | 10 g/L |
| | Glycine | 30 g/L |
| | $H_3BO_3$ | 25 g/L |
| | Borane Dimethylamine Complex | 1~4 g/L |
| Plating Solution Temperature | 45° C. | |
| Current Density | 2 A/dm$^2$ | |
| Plating Thickness | 2.0 μm | |

TABLE 16

Ni—B—Zn Alloy Plating Conditions

| | Conditions | |
|---|---|---|
| Plating Solution Composition | $NiSO_4$ | 280 g/L |
| | $ZnSO_4$ | 20 g/L |
| | $Na_2SO_4$ | 150 g/L |
| | $H_3BO_3$ | 50 g/L |
| | Borane Dimethylamine Complex | 1~4 g/L |
| Plating Solution Temperature | 45° C. | |
| Current Density | 10 A/dm$^2$ | |
| Plating Thickness | 2.0 μm | |

TABLE 17

Reflowed Sn Plating Conditions

| | Conditions | |
|---|---|---|
| Plating Solution Composition | Methane-sulfonic acid | 100 g/L |
| | Tin Methane-sulfonate | 200 g/L |
| | Surfactant | 2 g/L |
| Plating Solution Temperature | 40° C. | |
| Current Density | 10 A/dm$^2$ | |
| Reflow Condition | 260° C., 5s, Quenching at 60° C. | |
| Plating Thickness | 1.5 μm | |

TABLE 18

Composition of Intermediate Layer, Thickness of Each Layer, and Average Grain Size of Diffusion Layer

| No. | Intermediate Layer Composition | Thickness of Intermediate Layer μm | Thickness of Diffusion Layer μm | Average Grain Size of Diffusion Layer μm | Thickness of Surface Plating Layer μm |
|---|---|---|---|---|---|
| 30 | Ni—1.2%B | 1.9 | 0.5 | 0.4 | 1.1 |
| 31 | Ni—2.0%B | 1.9 | 0.6 | 0.2 | 1.0 |
| 32 | Ni—1.6%B—15.2%Cu | 1.8 | 0.4 | 0.6 | 1.3 |
| 33 | Ni—2.5%B—16.1%Cu | 1.8 | 0.6 | 0.4 | 1.1 |
| 34 | Ni—1.2%B—13.5%Sn | 1.9 | 0.5 | 0.4 | 1.1 |
| 35 | Ni—2.2%B—13.7%Sn | 1.8 | 0.7 | 0.5 | 1.0 |
| 36 | Ni—1.3%B—15.2%Zn | 1.9 | 0.4 | 0.3 | 1.2 |
| 37 | Ni—2.1%B—15.5%Zn | 1.8 | 0.6 | 0.4 | 1.1 |

Heat resistance, soldering properties, existence of thermal peeling, and change in contact resistance were evaluated under the same conditions as those of the first embodiment. The results are shown in Table 19. Consequently, it was apparent that materials according to the present invention are superior with respect to all evaluation criteria.

TABLE 19

Evaluation of Heat Resistance

| No. | Intermediate Layer Composition | Appearance (1) | Thermal Peering (2) | Soldering Properties (3) After Heating | Soldering Properties (3) Before Heating | Contact Resistance (4) After Heating | Contact Resistance (4) Before Heating |
|---|---|---|---|---|---|---|---|
| Example | | | | | | | |
| 30 | Ni—1.2%B | ⊚ | ○ | ⊚ | ⊚ | ○ | ○ |
| 31 | Ni—2.0%B | ⊚ | ○ | ⊚ | ⊚ | ○ | ○ |
| 32 | Ni—1.6%B—15.2%Cu | ⊚ | ○ | ⊚ | ⊚ | ○ | ○ |
| 33 | Ni—2.5%B—16.1%Cu | ⊚ | Δ | ⊚ | ⊚ | ○ | ○ |
| 34 | Ni—1.2%B—13.5%Sn | ⊚ | ○ | ⊚ | ⊚ | ○ | ○ |
| 35 | Ni—2.2%B—13.7%Sn | ⊚ | ○ | ⊚ | ⊚ | ○ | ○ |
| 36 | Ni—1.3%B—15.2%Zn | ⊚ | ○ | ⊚ | ⊚ | ○ | ○ |
| 37 | Ni—2.1%B—15.5%Zn | ⊚ | ○ | ⊚ | ⊚ | ○ | ○ |
| Comparative Example | | | | | | | |
| 38 | No Intermediate Layer | Δ | ○ | ⊚ | Δ | ○ | Δ |
| 39 | Cu | ○ | x | ⊚ | ○ | ○ | x |
| 40 | Ni | ⊚ | ○ | ⊚ | Δ | ○ | Δ |
| 41 | Ni—0.01%B | ⊚ | ○ | ⊚ | Δ | ○ | Δ |

(1) Appearance ⊚: Glossy appearance, ○: Partially haziness, Δ: Semi-gloss
(2) Thermal Peeling ○: No Peeling, Δ: Partially peeling, x: Peeling over entire surface
(3) Soldering Property ⊚: Wetting after 1 to 2 seconds, ○: Wetting after 2 to 3 seconds, Δ: Wetting after 3 seconds or more, x: No wetting
(4) Contact Resistance ○: 10 mΩ or less, Δ: 10~20 mΩ, x: 20 mΩ or more The evaluated results with respect to the insertion and withdrawal properties thereof are shown in Table 20. Consequently, it was apparent that the insertion force for the terminal is superior to that of the comparative materials in every type.

TABLE 20

Evaluation of Insertion and Withdrawal Properties

| No. | Intermediate Layer Composition | Insertion and Withdrawal Properties |
|---|---|---|
| Example | | |
| 30 | Ni-1.2% B | ○ |
| 31 | Ni-2.0% B | ○ |
| 32 | Ni-1.6% B-15.2% Cu | ○ |
| 33 | Ni-2.5% B-16.1% Cu | ○ |
| 34 | Ni-1.2% B-13.5% Sn | ○ |
| 35 | Ni-2.2% B-13.7% Sn | ○ |
| 36 | Ni-1.3% B-15.2% Zn | ○ |
| 37 | Ni-2.1% B-15.5% Zn | ○ |
| Comparative Example | | |
| 38 | No Intermediate Layer | X |
| 39 | Cu | Δ |
| 40 | Ni | X |
| 41 | Ni-0.01% B | X |

Insertion and Withdrawal Properties
○: 1.2 N or less,
Δ: 1.2~1.4 N,
X: 1.4 N or more

Third Embodiment

Next, a third embodiment according to the present invention is explained. As a base metal, phosphor bronze (according to Japanese Industrial Standard C5191) having a thickness of 0.2 mm for the evaluation of heat resistance, and an oxygen free copper (according to Japanese Industrial Standard C1020) having a thickness of 0.5 mm for the evaluation of insertion and withdrawal properties, which were degreased and pickled, were employed. Surface layers of these materials were plated by Sn and reflowed, and these materials were employed for evaluation. Furthermore, the above plated materials were subjected to phosphate treatment, sealing, or lubrication treatment, and these materials were also evaluated.

Plating conditions of a Ni—P—B type and types to which Sn, Cu, or Zn were added thereto are shown in Tables 21 to 24. Sn plating conditions of the surface layer are shown in Table 25. Composition of the intermediate layer, thickness and average grain size of the diffusion layer, and thickness of the surface layer, are shown in Table 26. In addition, a material having no intermediate layer, a material in which an intermediate layer consisting of Cu having a thickness of 0.5 μm, a material in which an intermediate layer consisting of Ni having a thickness of 2.0 μm, and a material in which an intermediate layer consisting of Ni-0.01% B alloy, were also prepared as comparative materials. It was confirmed that the contents of P and B in the reflowed Sn plating portion of each material range from 0.01 to 1% according to the present invention.

The conditions of the phosphate treatment are shown in Table 27.

TABLE 21

Ni—P—B Alloy Plating Conditions

| | | Conditions |
|---|---|---|
| Plating Solution Composition | $NiSO_4$ | 150 g/L |
| | $NiCl_2$ | 45 g/L |
| | $H_3PO_4$ | 50 g/L |
| | $H_2PHO_3$ | 5–10 g/L |
| | Borane Dimethylamine Complex | 0.5~1.0 g/L |

TABLE 21-continued

Ni—P—B Alloy Plating Conditions

| | Conditions |
|---|---|
| Plating Solution Temperature | 50° C. |
| Current Density | 5 A/dm$^2$ |
| Plating Thickness | 2.0 μm |

TABLE 22

Ni—P—B—Sn Alloy Plating Conditions

| | Conditions | |
|---|---|---|
| Plating Solution Composition | $NiSO_4$ | 150 g/L |
| | $SnSO_4$ | 20 g/L |
| | $H_3PO_4$ | 50 g/L |
| | $H_2PHO_3$ | 5~10 g/L |
| | Borane Dimethylamine Complex | 0.5~1.0 g/L |
| Plating Solution Temperature | 50° C. | |
| Current Density | 3 A/dm$^2$ | |
| Plating Thickness | 2.0 μm | |

TABLE 23

Ni—P—B—Cu Alloy Plating Conditions

| | Conditions | |
|---|---|---|
| Plating Solution Composition | $NiSO_4$ | 100 g/L |
| | $CuSO_4$ | 10 g/L |
| | Glycine | 30 g/L |
| | $H_3PO_4$ | 25 g/L |
| | $H_2PHO_3$ | 5~10 g/L |
| | Borane Dimethylamine Complex | 0.5~1.0 g/L |
| Plating Solution Temperature | 25° C. | |
| Current Density | 2 A/dm$^2$ | |
| Plating Thickness | 2.0 μm | |

TABLE 24

Ni—P—B—Zn Alloy Plating Conditions

| | Conditions | |
|---|---|---|
| Plating Solution Composition | $NiSO_4$ | 150 g/L |
| | $ZnSO_4$ | 20 g/L |
| | $Na_2SO_4$ | 150 g/L |
| | $H_3PO_4$ | 40 g/L |
| | $H_2PHO_3$ | 5~10 g/L |
| | Borane Dimethylamine Complex | 0.5~1.0 g/L |
| Plating Solution Temperature | 50° C. | |
| Current Density | 3 A/dm$^2$ | |
| Plating Thickness | 2.0 μm | |

TABLE 25

Reflowed Sn Plating Conditions

| | Conditions | |
|---|---|---|
| Plating Solution Composition | Methane-sulfonic acid | 100 g/L |
| | Tin Methane-sulfonate | 200 g/L |
| | Surfactant | 2 g/L |
| Plating Solution Temperature | 40° C. | |
| Current Density | 10 A/dm$^2$ | |
| Reflow Condition | 260° C., 5s, Quenching at 60° C. | |
| Plating Thickness | 1.5 μm | |

TABLE 26

Composition of Intermediate Layer, Thickness of Each Layer, and Average Grain Size of Diffusion Layer

| No. | Intermediate Layer Composition | Concentration of P or B in Surface Layer (%) | Thickness of Intermediate Layer μm | Thickness of Diffusion Layer μm | Average Grain Size of Diffusion Layer μm | Thickness of Surface Plating Layer μm |
|---|---|---|---|---|---|---|
| 42 | Ni—5.2%P—0.25%B | P:0.1,B:0.1 | 1.8 | 0.3 | 0.2 | 1.4 |
| 43 | Ni—10.4%P—1.2%B | P:0.2,B:0.2 | 1.9 | 0.5 | 0.3 | 1.1 |
| 44 | Ni—4.4%P—0.4%B—15.2%Cu | P:0.1,B:0.1 | 1.7 | 0.4 | 0.4 | 1.4 |
| 45 | Ni—9.2%P—1.2%B—16.1%Cu | P:0.2,B:0.2 | 1.8 | 0.6 | 0.3 | 1.1 |
| 46 | Ni—5.2%P—0.4%B—4.4%Sn | P:0.1,B:0.1 | 1.7 | 0.3 | 0.5 | 1.0 |
| 47 | Ni—10.2%P—1.1%B—5.1%Sn | P:0.2,B:0.2 | 1.8 | 0.5 | 0.3 | 1.2 |
| 48 | Ni—4.4%P—0.3%B—5.4%Zn | P:0.1,B:0.1 | 1.8 | 0.4 | 0.3 | 1.3 |
| 49 | Ni—9.2%P—1.4%B—5.6%Zn | P:0.2,B:0.2 | 1.9 | 0.6 | 0.4 | 1.0 |

TABLE 27

| Conditions of Phosphate Treatment | Conditions | |
|---|---|---|
| Treating Solution Composition | $Sn(H_2PO_4)_2.2H_2O$ | 70 g/L |
| | $H_3PO_4$ | 50 g/L |
| Treating Temperature | 90° C. | |
| Treating Time | 10 minutes | |
| Treating Method | Electroless Treatment | |

Heat resistance, soldering properties, existence of thermal peeling, and change in contact resistance were evaluated under the same conditions as those of the first embodiment. The results are shown in Table 28. Consequently, although some materials were slightly inferior with respect to the contact resistance, it is apparent that materials according to the present invention are superior overall.

TABLE 28

Evaluation of Heat Resistance

| No. | Conditions: Intermediate Layer Composition | Conditions: After-treatment | Appearance (1) | Thermal Peering (2) | Soldering Properties (3): After Heating | Soldering Properties (3): Before Heating | Contact Resistance (4): After Heating | Contact Resistance (4): Before Heating |
|---|---|---|---|---|---|---|---|---|
| Example | | | | | | | | |
| 42 | Ni—5.2%P—0.25%B | — | ⊚ | ○ | ⊚ | ⊚ | ○ | ○ |
| 43-1 | Ni—10.4%P—1.2%B | — | ⊚ | ○ | ⊚ | ⊚ | ○ | Δ |
| 44 | Ni—4.4%P—0.4%B—15.2%Cu | — | ⊚ | ○ | ⊚ | ⊚ | ○ | ○ |
| 45 | Ni—9.2%P—1.2%B—16.1%Cu | — | ⊚ | Δ | ⊚ | ⊚ | ○ | ○ |
| 46 | Ni—5.2%P—0.4%B—4.4%Sn | — | ⊚ | ○ | ⊚ | ⊚ | ○ | ○ |
| 47-1 | Ni—10.2%P—1.1%B—5.1%Sn | — | ⊚ | ○ | ⊚ | ⊚ | ○ | Δ |
| 48 | Ni—4.4%P—0.3%B—5.4%Zn | — | ⊚ | ○ | ⊚ | ⊚ | ○ | ○ |
| 49 | Ni—9.2%P—1.4%B—5.6%Zn | — | ⊚ | ○ | ⊚ | ⊚ | ○ | Δ |
| 43-2 | Ni—10.4%P—1.2%B | Sealing | ⊚ | ○ | ⊚ | ⊚ | ○ | ○ |
| 43-3 | Ni—10.4%P—1.2%B | Lubrication Treatment | ⊚ | ○ | ⊚ | ⊚ | ○ | ○ |
| 43-4 | Ni—10.4%P—1.2%B | Phosphate Treatment | ⊚ | ○ | ⊚ | ⊚ | ○ | Δ |
| 47-2 | Ni—10.2%P—1.1%B—5.1%Sn | Sealing | ⊚ | ○ | ⊚ | ⊚ | ○ | ○ |
| 47-3 | Ni—10.2%P—1.1%B—5.1%Sn | Sealing | ⊚ | ○ | ⊚ | ⊚ | ○ | ○ |
| 47-4 | Ni—10.2%P—1.1%B—5.1%Sn | Phosphate Treatment | ⊚ | ○ | ⊚ | ⊚ | ○ | Δ |
| Comparative Example | | | | | | | | |
| 50 | No Intermediate Layer | — | Δ | ○ | ⊚ | Δ | ○ | Δ |
| 51 | Cu | — | ○ | x | ⊚ | ○ | ○ | x |
| 52 | Ni | — | ⊚ | ○ | ⊚ | Δ | ○ | Δ |
| 53 | Ni—0.01%P—0.01%B | — | ⊚ | ○ | ⊚ | Δ | ○ | Δ |

(1) Appearance ⊚: Glossy appearance, ○: Partially haziness, Δ: Semi-gloss
(2) Thermal Peeling ○: No Peeling, Δ: Partially peeling, x: Peeling over entire surface
(3) Soldering Property ⊚: Wetting after 1 to 2 seconds, ○: Wetting after 2 to 3 seconds, Δ: Wetting after 3 seconds or more, x: No wetting
(4) Contact Resistance ○: 10 mΩ or less, Δ: 10~20 mΩ, x: 20 mΩ or more In the sealing and lubrication treatment, liquid marketed for the sealing of Au plating was applied to the plated material and was dried by a blower. The evaluated results with respect to the insertion and withdrawal properties thereof are shown in Table 29. Consequently, it was apparent that the insertion force for the terminal is superior to that of the comparative materials in every type.

TABLE 29

Evaluation of Insertion and Withdrawal Properties

| No. | Conditions: Intermediate Layer Composition | Conditions: After-treatment | Insertion and Withdrawal Properties |
|---|---|---|---|
| Example | | | |
| 42 | Ni—5.2%P—0.25%B | — | ○ |
| 43-1 | Ni—10.4%P—1.2%B | — | ○ |
| 44 | Ni—4.4%P—0.4%B—15.2%Cu | — | ○ |
| 45 | Ni—9.2%P—1.2%B—16.1%Cu | — | ○ |
| 46 | Ni—5.2%P—0.4%B—4.4%Sn | — | ○ |
| 47-1 | Ni—10.2%P—1.1%B—5.1%Sn | — | ○ |
| 48 | Ni—4.4%P—0.3%B—5.4%Zn | — | ○ |
| 49 | Ni—9.2%P—1.4%B—5.6%Zn | — | ○ |
| 43-2 | Ni—10.4%P—1.2%B | Sealing | ○ |
| 43-3 | Ni—10.4%P—1.2%B | Lubrication Treatment | ○ |
| 43-4 | Ni—10.4%P—1.2%B | Phosphate Treatment | ◎ |
| 47-2 | Ni—10.2%P—1.1%B—5.1%Sn | Sealing | ○ |
| 47-3 | Ni—10.2%P—1.1%B—5.1%Sn | Lubrication Treatment | ○ |
| 47-4 | Ni—10.2%P—1.1%B—5.1%Sn | Phosphate Treatment | ◎ |
| Comparative Example | | | |
| 50 | No Intermediate Layer | — | x |
| 51 | Cu | — | Δ |
| 52 | Ni | — | x |
| 53 | Ni—0.01%P—0.01%B | — | x |

Insertion and Withdrawal Properties ◎: 0.8N or less, ○: 0.8~1.2N, Δ: 1.2~1.4N, x: 1.4N or more

Fourth Embodiment

Next, a fourth embodiment according to the present invention is explained. As a base metal, phosphor bronze (according to Japanese Industrial Standard C5191) having a thickness of 0.2 mm for the evaluation of heat resistance, and an oxygen free copper (according to Japanese Industrial Standard C1020) having a thickness of 0.5 mm for the evaluation of the insertion and withdrawal properties, which were degreased and pickled, were employed. Surface layers of these materials were mainly plated by Sn and reflowed and those of several materials were plated by hot-dipping, and these materials were employed for evaluation. The hot-dipping was carried out so that Sn melted at 270° C. is plated at a thickness of 2 $\mu$m.

Plating conditions of a Cu—P type and types to which Sn, Ni, or Zn were added thereto are shown in Tables 30 to 33, and plating conditions of a Cu—P—B type and types to which Sn, Ni, or Zn were added thereto are shown in Tables 34 to 37. Sn plating conditions of the surface layer are shown in Table 38. Composition of the intermediate layer, thickness and particle size of the diffusion layer, and thickness of the surface layer, are shown in Table 39. In addition, a material having no intermediate layer, a material in which an intermediate layer consisting of Cu having a thickness of 0.5 $\mu$m, a material in which an intermediate layer consisting of Ni having a thickness of 2.0 $\mu$m, and a material in which an intermediate layer consisting of Cu-0.01% P alloy, were also prepared as comparative materials.

TABLE 30

Cu—P Alloy Plating Conditions

| | Conditions | |
|---|---|---|
| Plating Solution Composition | Potassium Pyrophosphate | 350 g/L |
| | Copper Pyrophosphate | 80 g/L |
| | $KNO_3$ | 12 g/L |
| | $NaPH_2O_2$ | 10~20 g/L |

TABLE 30-continued

Cu—P Alloy Plating Conditions

| | Conditions |
|---|---|
| Plating Solution Temperature | 70° C. |
| Current Density | 5 A/dm$^2$ |
| Plating Thickness | 2.0 $\mu$m |

TABLE 31

Cu—P—Sn Alloy Plating Conditions

| | Conditions | |
|---|---|---|
| Plating Solution Composition | Potassium Pyrophosphate | 350 g/L |
| | Copper Pyrophosphate | 80 g/L |
| | $K_2SnO_3$ | 20 g/L |
| | $KNO_3$ | 12 g/L |
| | Tin Pyrophosphate | 20 g/L |
| | $NaPH_2O_2$ | 10~20 g/L |
| Plating Solution Temperature | 70° C. | |
| Current Density | 5 A/dm$^2$ | |
| Plating Thickness | 2.0 $\mu$m | |

TABLE 32

Cu—P—Ni Alloy Plating Conditions

| | Conditions | |
|---|---|---|
| Plating Solution Compositon | Potassium Pyrophosphate | 350 g/L |
| | Copper Pyrophosphate | 80 g/L |
| | $NiSO_4$ | 20 g/L |
| | $KNO_3$ | 12 g/L |
| | $NaPH_2O_2$ | 10~20 g/L |
| Plating Solution Temperature | 60° C. | |
| Current Density | 5 A/dm$^2$ | |
| Plating Thickness | 2.0 $\mu$m | |

TABLE 33

Cu—P—Zn Alloy Plating Conditions

| | Conditions | |
|---|---|---|
| Plating Solution Composition | Potassium Pyrophosphate | 350 g/L |
| | Copper Pyrophosphate | 80 g/L |
| | $ZnSO_4$ | 10 g/L |
| | $KNO_3$ | 12 g/L |
| | $NaPH_2O_2$ | 10~20 g/L |
| Plating Solution Temperature | 60° C. | |
| Current Density | 1 A/dm$^2$ | |
| Plating Thickness | 2.0 μm | |

TABLE 34

Cu—P—B Alloy Plating Conditions

| | Conditions | |
|---|---|---|
| Plating Solution Composition | Potassium Pyrophosphate | 350 g/L |
| | Copper Pyrophosphate | 80 g/L |
| | $KNO_3$ | 12 g/L |
| | $NaPH_2O_2$ | 10~20 g/L |
| | Borane Dimethylamine Complex | 0.5~1.0 g/L |
| Plating Solution Temperature | 50° C. | |
| Current Density | 5 A/dm$^2$ | |
| Plating Thickness | 2.0 μm | |

TABLE 35

Cu—P—B—Sn Alloy Plating Conditions

| | Conditions | |
|---|---|---|
| Plating Solution Composition | Potassium Pyrophosphate | 350 g/L |
| | Copper Pyrophosphate | 80 g/L |
| | Tin Pyrophosphate | 20 g/L |
| | $K_2SnO_3$ | 20 g/L |
| | $KNO_3$ | 12 g/L |
| | $NaPH_2O_2$ | 10~20 g/L |
| | Borane Dimethylamine Complex | 0.5~1.0 g/L |
| Plating Solution Temperature | 50° C. | |
| Current Density | 3 A/dm$^2$ | |
| Plating Thickness | 2.0 μm | |

TABLE 36

Cu—P—B—Ni Alloy Plating Conditions

| | Conditions | |
|---|---|---|
| Plating Solution Composition | Potassium Pyrophosphate | 350 g/L |
| | Copper Pyrophosphate | 80 g/L |
| | $NiSO_4$ | 20 g/L |
| | $KNO_3$ | 12 g/L |
| | $NaPH_2O_2$ | 10~20 g/L |
| | Borane Dimethylamine Complex | 0.5~1.0 g/L |
| Plating Solution Temperature | 50° C. | |
| Current Density | 5 A/dm$^2$ | |
| Plating Thickness | 2.0 μm | |

TABLE 37

Cu—P—B—Zn Alloy Plating Conditions

| | Conditions | |
|---|---|---|
| Plating Solution Composition | Potassium Pyrophosphate | 350 g/L |
| | Copper Pyrophosphate | 80 g/L |
| | $ZnSO_4$ | 10 g/L |
| | $KNO_3$ | 12 g/L |
| | $NaPH_2O_2$ | 20 g/L |
| | Borane Dimethylamine Complex | 0.5 g/L |
| Plating Solution Temperature | 50° C. | |
| Current Density | 3 A/dm$^2$ | |
| Plating Thickness | 2.0 μm | |

TABLE 38

Reflowed Sn Plating Conditions

| | Conditions | |
|---|---|---|
| Plating Solution Composition | Methanesulfonic acid | 100 g/L |
| | Tin Methanesulfonate | 200 g/L |
| | Surfactant | 2 g/L |
| Plating Solution Temperature | 40° C. | |
| Current Density | 10 A/dm$^2$ | |
| Reflow Condition | 260° C., 5s, Quenching at 60° C. | |
| Plating Thickness | 1.5 μm | |

TABLE 39

Composition of Intermediate Layer, Thickness of Each Layer, and Average Grain Size of Diffusion Layer

| No. | Intermediate Layer Composition | Plating Method | Thickness of Intermediate Layer μm | Thickness of Diffusion Layer μm | Average Grain Size of Diffusion Layer μm | Thickness of Surface Plating Layer μm |
|---|---|---|---|---|---|---|
| 54 | Cu—1.0%P | Reflow | 1.7 | 0.4 | 1.2 | 1.2 |
| 55 | Cu—2.5%P | Reflow | 1.5 | 0.5 | 1.2 | 1.0 |
| 56 | Cu—5.5%P | Reflow | 1.4 | 0.6 | 1.0 | 0.9 |
| 57 | Cu—1.0%P—13.0%Ni | Reflow | 1.6 | 0.4 | 1.4 | 1.1 |
| 58 | Cu—2.4%P—13.2%Ni | Reflow | 1.6 | 0.4 | 1.4 | 1.1 |
| 59 | Cu—6.6%P—13.1%Ni | Reflow | 1.4 | 0.6 | 1.2 | 0.9 |
| 60 | Cu—1.2%P—15.5%Sn | Reflow | 1.5 | 0.5 | 1.1 | 1.0 |

TABLE 39-continued

| | Composition of Intermediate Layer, Thickness of Each Layer, and Average Grain Size of Diffusion Layer | | | | | |
|---|---|---|---|---|---|---|
| No. | Intermediate Layer Composition | Plating Method | Thickness of Intermediate Layer μm | Thickness of Diffusion Layer μm | Average Grain Size of Diffusion Layer μm | Thickness of Surface Plating Layer μm |
| 61 | Cu—2.4%P—15.5%Sn | Reflow | 1.5 | 0.5 | 1.0 | 1.0 |
| 62 | Cu—5.7%P—16.0%Sn | Reflow | 1.3 | 0.7 | 1.3 | 0.8 |
| 63 | Cu—1.1%P—15.2%Zn | Reflow | 1.6 | 0.4 | 1.3 | 1.1 |
| 64 | Cu—2.5%P—15.2%Zn | Reflow | 1.6 | 0.4 | 1.3 | 1.1 |
| 65 | Cu—5.7%P—15.5%Zn | Reflow | 1.4 | 0.6 | 1.2 | 0.9 |
| 66 | Cu—0.8%P—0.25%B | Reflow | 1.7 | 0.3 | 1.2 | 1.2 |
| 67 | Cu—2.5%P—0.25%B | Reflow | 1.7 | 0.3 | 1.2 | 1.2 |
| 68 | Cu—5.5%P—1.2%B | Reflow | 1.5 | 0.5 | 1.3 | 1.0 |
| 69 | Cu—1.1%P—0.4%B—13.2%Ni | Reflow | 1.6 | 0.4 | 1.4 | 1.1 |
| 70 | Cu—3.1%P—0.4%B—13.2%Ni | Reflow | 1.6 | 0.4 | 1.4 | 1.1 |
| 71 | Cu—6.6%P—1.2%B—13.1%Ni | Reflow | 1.4 | 0.6 | 1.3 | 0.9 |
| 72 | Cu—0.8%P—0.4%B—14.4%Sn | Reflow | 1.7 | 0.3 | 1.5 | 1.2 |
| 73 | Cu—2.4%P—0.4%B—14.4%Sn | Reflow | 1.7 | 0.3 | 1.5 | 1.2 |
| 74 | Cu—5.5%P—1.1%B—15.1%Sn | Reflow | 1.5 | 0.5 | 1.3 | 1.0 |
| 75 | Cu—0.7%P—0.3%B—15.4%Zn | Reflow | 1.6 | 0.4 | 1.3 | 1.1 |
| 76 | Cu—2.2%P—0.3%B—15.4%Zn | Reflow | 1.6 | 0.4 | 1.3 | 1.1 |
| 77 | Cu—5.5%P—1.4%B—15.6%Zn | Reflow | 1.4 | 0.6 | 1.4 | 0.9 |
| 78 | Cu—1.0%P | Hot Dipping | 1.7 | 0.4 | 1.2 | 1.7 |
| 79 | Cu—2.5%P | Hot Dipping | 1.5 | 0.5 | 1.2 | 1.5 |
| 80 | Cu—5.5%P | Hot Dipping | 1.4 | 0.6 | 1.0 | 1.4 |

Heat resistance, soldering properties, existence of thermal peeling, and change in contact resistance were evaluated under the same conditions as those of the first embodiment. The results are shown in Table 40. Consequently, it was apparent that materials according to the present invention were superior with respect to all evaluation criteria.

TABLE 40

| | Evaluation of Heat Resistance | | | | | | |
|---|---|---|---|---|---|---|---|
| | | | Thermal | Soldering Properties (3) | | Contact Resistance (4) | |
| No. | Intermediate Layer Composition | Appearance (1) | Peering (2) | After Heating | Before Heating | After Heating | Before Heating |
| Example | | | | | | | |
| 54 | Cu—1.0%P | ⊚ | Δ | ⊚ | ⊚ | ○ | ○ |
| 55 | Cu—2.5%P | ⊚ | Δ | ⊚ | ⊚ | ○ | ○ |
| 56 | Cu—5.5%P | ⊚ | x | ⊚ | ⊚ | ○ | ○ |
| 57 | Cu—1.0%P—13.0%Ni | ⊚ | ○ | ⊚ | ⊚ | ○ | ○ |
| 58 | Cu—2.4%P—13.2%Ni | ⊚ | ○ | ⊚ | ⊚ | ○ | ○ |
| 59 | Cu—6.6%P—13.1%Ni | ⊚ | Δ | ⊚ | ⊚ | ○ | ○ |
| 60 | Cu—1.2%P—15.5%Sn | ⊚ | ○ | ⊚ | ⊚ | ○ | ○ |
| 61 | Cu—2.4%P—15.5%Sn | ⊚ | Δ | ⊚ | ⊚ | ○ | ○ |
| 62 | Cu—5.7%P—16.0%Sn | ⊚ | Δ | ⊚ | ⊚ | ○ | ○ |
| 63 | Cu—1.1%P—15.2%Zn | ⊚ | ○ | ⊚ | ⊚ | ○ | ○ |
| 64 | Cu—2.5%P—15.2%Zn | ⊚ | ○ | ⊚ | ⊚ | ○ | ○ |
| 65 | Cu—5.7%P—15.5%Zn | ⊚ | ○ | ⊚ | ⊚ | ○ | ○ |
| 66 | Cu—0.8%P—0.25%B | ⊚ | Δ | ⊚ | ⊚ | ○ | ○ |
| 67 | Cu—2.5%P—0.25%B | ⊚ | Δ | ⊚ | ⊚ | ○ | ○ |
| 68 | Cu—5.5%P—1.2%B | ⊚ | x | ⊚ | ⊚ | ○ | ○ |
| 69 | Cu—1.1%P—0.4%B—13.2%Ni | ⊚ | ○ | ⊚ | ⊚ | ○ | ○ |
| 70 | Cu—3.1%P—0.4%B—13.2%Ni | ⊚ | ○ | ⊚ | ⊚ | ○ | ○ |
| 71 | Cu—6.6%P—1.2%B—13.1%Ni | ⊚ | Δ | ⊚ | ⊚ | ○ | ○ |
| 72 | Cu—0.8%P—0.4%B—14.4%Sn | ⊚ | Δ | ⊚ | ⊚ | ○ | ○ |
| 73 | Cu—2.4%P—0.4%B—14.4%Sn | ⊚ | Δ | ⊚ | ⊚ | ○ | ○ |
| 74 | Cu—5.5%P—1.1%B—15.1%Sn | ⊚ | Δ | ⊚ | ⊚ | ○ | ○ |
| 75 | Cu—0.7%P—0.3%B—15.4%Zn | ⊚ | ○ | ⊚ | ⊚ | ○ | ○ |
| 76 | Cu—2.2%P—0.3%B—15.4%Zn | ⊚ | ○ | ⊚ | ⊚ | ○ | ○ |
| 77 | Cu—5.5%P—1.4%B—15.6%Zn | ⊚ | ○ | ⊚ | ⊚ | ○ | ○ |
| 78 | Cu—1.0%P | ⊚ | Δ | ⊚ | ⊚ | ○ | ○ |
| 79 | Cu—2.5%P | ⊚ | Δ | ⊚ | ⊚ | ○ | ○ |
| 80 | Cu—5.5%P | ⊚ | x | ⊚ | ⊚ | ○ | ○ |

TABLE 40-continued

Evaluation of Heat Resistance

| No. | Intermediate Layer Composition | Appearance (1) | Thermal Peering (2) | Soldering Properties (3) After Heating | Soldering Properties (3) Before Heating | Contact Resistance (4) After Heating | Contact Resistance (4) Before Heating |
|---|---|---|---|---|---|---|---|
| Comparative Example | | | | | | | |
| 81 | No Intermediate Layer | Δ | ○ | ⊚ | Δ | ○ | Δ |
| 82 | Cu | ○ | x | ⊚ | ○ | ○ | x |
| 83 | Ni | ⊚ | ○ | ⊚ | Δ | ○ | Δ |
| 84 | Cu—0.01%P | ○ | x | ⊚ | ○ | ○ | x |

(1) Appearance ⊚: Glossy appearance, ○: Partially haziness, Δ: Semi-gloss
(2) Thermal Peeling ○: No Peeling, Δ: Partially peeling, x: Peeling over entire surface
(3) Soldering Property ⊚: Wetting after 1 to 2 seconds, ○: Wetting after 2 to 3 seconds, Δ: Wetting after 3 seconds or more, x: No wetting
(4) Contact Resistance ○: 10 mΩ or less, Δ: 10~20 mΩ, x: 20 mΩ or more The evaluated results with respect to the insertion and withdrawal properties thereof are shown in Table 41. Consequently, it was apparent that the insertion force for the terminal is superior to that of the comparative materials in every type.

TABLE 41

Evaluation of Insertion and Withdrawal Properties

| No. | Intermediate Layer Composition | Insertion and Withdrawal Properties |
|---|---|---|
| Example | | |
| 54 | Cu-1.0% P | ○ |
| 55 | Cu-2.5% P | ○ |
| 56 | Cu-5.5% P | ○ |
| 57 | Cu-1.0% P-13.0% Ni | ○ |
| 58 | Cu-2.4% P-13.2% Ni | ○ |
| 59 | Cu-6.6% P-13.1% Ni | ○ |
| 60 | Cu-1.2% P-15.5% Sn | ○ |
| 61 | Cu-2.4% P-15.5% Sn | ○ |
| 62 | Cu-5.7% P-16.0% Sn | ○ |
| 63 | Cu-1.1% P-15.2% Zn | ○ |
| 64 | Cu-2.5% P-15.2% Zn | ○ |
| 65 | Cu-5.7% P-15.5% Zn | ○ |
| 66 | Cu-0.8% P-0.25% B | ○ |
| 67 | Cu-2.5% P-0.25% B | ○ |
| 68 | Cu-5.5% P-1.2% B | ○ |
| 69 | Cu-1.1% P-0.4% B-13.2% Ni | ○ |
| 70 | Cu-3.1% P-0.4% B-13.2% Ni | ○ |
| 71 | Cu-6.6% P-1.2% B-13.1% Ni | ○ |
| 72 | Cu-0.8% P-0.4% B-14.4% Sn | ○ |
| 73 | Cu-2.4% P-0.4% B-14.4% Sn | ○ |
| 74 | Cu-5.5% P-1.1% B-15.1% Sn | ○ |
| 75 | Cu-0.7% P-0.3% B-15.4% Zn | ○ |
| 76 | Cu-2.2% P-0.3% B-15.4% Zn | ○ |
| 77 | Cu-5.5% P-1.4% B-15.6% Zn | ○ |
| 78 | Cu-1.0% P | ○ |
| 79 | Cu-2.5% P | ○ |
| 80 | Cu-5.5% P | ○ |
| Comparative Example | | |
| 81 | No Intermediate Layer | X |
| 82 | Cu | Δ |
| 83 | Ni | X |
| 84 | Cu-0.01% P | X |

Insertion and Withdrawal Properties
○: 1.2 N or less,
Δ: 1.2~1.4 N,
X: 1.4 N or more As described above, according to the present invention, a material can be provided in which the heat resistance and the insertion and withdrawal properties are simultaneously satisfactory.

What is claimed is:

1. A metallic material comprising an intermediate layer on a base metal consisting of Cu or Cu alloy, and a surface layer consisting of Sn or Sn alloy plated on said intermediate layer, wherein said intermediate layer of alloy-plating consists of Ni alloy or Cu alloy including at least one of P in an amount of 0.05 to 20% by weight and B in amount of 0.05 to 20% by weight, at least one of Sn, Cu or Z in a total amount of 10% to 60% by weight and the balance consisting of Ni and unavoidable impurities.

2. A metallic material as recited in claim 1, wherein said intermediate layer is made of an alloy consisting of P in an amount of 0.05 to 20% by weight, at least one of Sn, Cu, and Zn, in a total amount of 10 to 60% by weight, and the balance consisting of Ni and unavoidable impurities.

3. A metallic material as recited in claim 1, wherein said intermediate layer is made of an alloy consisting of P in an amount of 0.05 to 20% by weight, B in an amount of 0.05 to 20% by weight, at least one of Sn, Cu, and Zn, in a total amount of 10 to 60% by weight, and the balance consisting of Ni and unavoidable impurities.

4. A metallic material as recited in claim 1, wherein said intermediate layer is made of an alloy consisting of B in an amount of 0.05 to 20% by weight, at least one of Sn, Cu, and Zn, in a total amount of 10 to 60% by weight, and the balance consisting of Ni and unavoidable impurities.

5. A metallic material as recited in claim 1, wherein said intermediate layer is made of a Ni alloy containing P and/or B in a total amount of 0.05 to 20% by weight, and at least one of Sn, Cu, and Zn, in a total amount of 10 to 60% by weight.

6. A metallic material comprising an intermediate layer on a base metal consisting of Cu or Cu alloy, and a surface layer consisting of Sn or Sn alloy plated on said intermediate layer wherein said intermediate layer of alloy plating consists of Ni alloy or Cu alloy and said intermediate layer made of said alloy consists of P in an amount of 0.05 to 20% by weight, B in an amount of 0.05 to 20% by weight, and the balance consisting of Ni and unavoidable impurities.

7. A metallic material comprising an intermediate layer on a base metal consisting of Cu or Cu alloy, and a surface layer consisting of Sn or Sn alloy plated on said intermediate layer wherein said intermediate layer of alloy plating is made of an electroplated Ni alloy containing P and/or B in a total amount of 0.05 to 20% by weight, and P and/or B content in said surface layer is increased in a total amount of 0.01 to 1% by weight by carrying out a reflow treatment after forming said surface layer.

8. A metallic material comprising an intermediate layer on a base metal consisting of Cu or Cu alloy, and a surface layer consisting of Sn or Sn alloy plated on said intermediate layer wherein said intermediate layer of alloy plating is made of an electroplated Ni alloy containing P and/or B in a total amount of 0.05 to 20% by weight, and P and/or B contained in said intermediate layer is diffused toward a surface of said Sn or Sn alloy plating layer by carrying out a reflow treatment and/or a heating treatment after forming said surface layer.

9. A metallic material as recited in claim 8, wherein a film consisting of organic phosphorus compound or inorganic phosphorus compound is formed after said reflow treatment or after said heating treatment.

10. A process of manufacture for a metallic material recited in claim 9, wherein said material is dipped in a solution containing phosphate ions in an amount of 0.1 to 2 mol/L, or said material is subjected to an electrolytic treatment in a solution as an anode, after said reflow treatment or after said heating treatment.

11. A process of manufacture for a metallic material recited in claim 8, wherein a sealing and/or a lubrication treatment is carried out after said reflow treatment or after said heating treatment.

12. A metallic material comprising an intermediate layer on a base metal consisting of Cu or Cu alloy, and a surface layer consisting of Sn or Sn alloy plated on said intermediate layer wherein said intermediate layer of alloy plating consists of Ni alloy or Cu alloy including at least one of P in an amount of 0.05 to 20% by weight and B in an amount of 0.05% to 20% by weight and wherein said Sn or Sn alloy plating layer contains C in an amount of 0.05 to 0.5% by weight.

13. A metallic material comprising an intermediate layer on a base metal consisting of Cu or Cu alloy and a surface layer consisting of Sn or Sn alloy plated on said intermediate layer wherein said intermediate layer of alloy plating consists of Ni alloy or Cu alloy including at least one of P in an amount of 0.05% to 20% by weight and B in an amount of 0.05% to 20% by weight and wherein said surface layer is a plating film in which an electroplated Sn or Sn alloy is subjected to a reflow treatment.

14. A metallic material comprising an intermediate layer on a base metal consisting of Cu or Cu alloy, and a surface layer consisting of Sn or Sn alloy plated on said intermediate layer wherein said intermediate layer of alloy plating consists of Ni alloy or Cu alloy including at least one of P in an amount of 0.05 to 20% by weight and B in an amount of 0.05% to 20% by weight and wherein an aging treatment is carried out after said plating or after reflow treatment.

15. A metallic material comprising an intermediate layer on a base metal consisting of Cu or Cu alloy, and a surface layer consisting of Sn or Sn alloy plated on said intermediate layer wherein said intermediate layer of alloy plating consists of Ni alloy or Cu alloy and is made of an alloy containing P in an amount of 0.05 to 15% by weight, and the balance consisting of Cu and unavoidable impurities.

16. A metallic material as recited in claim 15, wherein a diffusion layer consisting primarily of Sn and Cu, which is formed between said surface layer and said intermediate layer, has a thickness of 1 μm or less, and average grain size constituting said diffusion layer is 1.5 μm or less.

17. A metallic material as recited in claim 15, wherein P and/or B is contained an amount of 0.05 to 1% by weight in said Sn or Sn alloy layer, respectively.

18. A metallic material comprising an intermediate layer on a base metal consisting of Cu or Cu alloy, and a surface layer consisting of Sn or Sn alloy plated on said intermediate layer of alloy plating consists of Ni alloy or Cu alloy and wherein said intermediate layer is made of an alloy consisting of P in an amount of 0.05 to 15% by weight, at least one of Sn, Ni, and Zn, in a total amount of 10 to 60% by weight, and the balance consisting of Cu and unavoidable impurities.

19. A metallic material as recited in claim 18, wherein said Sn or Sn alloy layer is subjected to a Sn hot dipping method.

20. A metallic material comprising an intermediate layer on a base metal consisting of Cu or Cu alloy, and a surface layer consisting of Sn or Sn alloy plated on said intermediate layer wherein said intermediate layer of alloy plating consists of Ni alloy or Cu alloy and wherein said intermediate layer made of said alloy consists of P in an amount of 0.05 to 15% by weight, B in an amount of 0.05 to 15% by weight, and the balance consisting of Cu and unavoidable impurities.

21. A metallic material comprising an intermediate layer on a base metal consisting of Cu or Cu alloy, and a surface layer consisting of Sn or Sn alloy plated on said intermediate layer of alloy plating wherein said intermediate layer consists of Ni alloy or Cu alloy and wherein said intermediate layer made of said alloy consists of P in an amount of 0.05 to 15% by weight, B in an amount of 0.05 to 15% by weight, at least one of Sn, Ni, and Zn, in a total amount of 10 to 60% by weight, and the balance consisting of Cu and unavoidable impurities.

22. A terminal and a connector having superior heat resistance, aging resistance, and insertion and withdrawal properties, wherein a contact is made of metallic material comprising an intermediate layer on a base metal consisting of Cu or Cu alloy, and a surface layer consisting of Sn or Sn alloy plated one said intermediate layer, wherein said intermediate layer of alloy plating consists of Ni alloy or Cu alloy including at least on of P in an amount of 0.05% to 20% by weight and B in an amount of 0.05% to 20% by weight.

* * * * *